Chromatogram Using Conventional Soda Lime Glass Bead Support

Chromatogram Using Sodium Silicate Glass Bead Support

CHROMATOGRAMS ILLUSTRATING THE EFFECTS OF ETCHING

Etched Soda Lime Glass Bead Support

Etched Sodium Silicate Glass Bead Support

United States Patent Office 3,453,806
Patented July 8, 1969

3,453,806
CHROMATOGRAPHY METHOD AND APPARATUS
Augustus M. Filbert and Michael L. Hair, Corning, N.Y., assignors to Corning Glass Works, Corning, N.Y., a corporation of New York
Filed Oct. 26, 1966, Ser. No. 589,647
Int. Cl. B01d *15/08*
U.S. Cl. 55—67                                  12 Claims

ABSTRACT OF THE DISCLOSURE

Method of separating complex mixtures into their components by passing the mixtures in the vapor phase with an inert carrier gas through a liquid partition zone containing a stationary phase on a solid support comprising particles of a glass consisting essentially as calculated from the batch on the oxide basis of 50–95 mole percent silica and 5–50 mole percent of alkali metal oxide; also includes the solid support material and chromatographic columns containing the solid support material.

---

This invention relates to gas chromatography and more particularly it relates to a solid support material for chromatographic columns.

Gas-liquid partition chromatography is a recent and very successful technique developed for analytical separations of complex compounds. This is a special form of chromatography having particular advantages, such as low cost, high sensitivity in trace analyses, good quantitative accuracy, and ease of data interpretation. The technique is suitable for materials which are volatile without decomposition. Separation of the sample depends upon a difference in the distribution coefficient between a gaseous moving phase and a stationary phase of a nonvolatile liquid solvent spread as a thin film over a solid support. The sample to be analyzed is introduced into the moving gas stream and is carried on a chromatographic column. Constituents of the sample, commonly referred to as solutes, are distributed between the two phases and having differences in solubilities, they travel along the column at different rates and emerge at the end as distinct peaks separated by the carrier gas. Suitable means for detecting the vapor in the carrier gas and automatically recording the results are attached to the end of the column.

Since the column is the key to any chromatographic system, improvement in the support materials has been an important area of investigation. The ideal solid support should be chemically inert and thermally stable and have a high mechanical strength coupled with a relatively large surface area. The function of the support is to provide a surface for the thin liquid film with as large an interface as possible between the moving phase and the stationary phase, so as to facilitate partition between them. The most commonly used solid support material has been diatomaceous earth which consists of agglomerates of the siliceous skeletons of diatoms. These are treated in different ways to produce commercially available materials, such as Celite 545, firebrick, and Chromosorbs P and W. However, the use of ground diatomaceous earth has presented certain disadvantages because this support material is not completely inert and some reaction may occur with the components of the sample. Thus, serious tailing effects are observed due to strong adsorption. Further the sample has in some instances been chemically changed, as for example, by isomerization or dehydration. Various attempts have been made to improve the symmetry of elution peaks by reducing the activity of the support. It has been suggested to chemically treat the support materials to remove the active sites and thereby eliminate the tailing effects. While acid washing can remove metal groups, the diatomaceous earths contain silanol and siloxane groups, capable of acting as adsorption sites for hydrogen bonding to solute molecules, that are not removed by washing.

Among nonporous supports, soda-lime glass microbeads have been used most extensively because of their low porosity and very uniform size and shape. Since porosity is negligible, the stagnant gas phase encountered with porous supports is absent and resistance to gas phase mass transfer is reduced. With spherical glass beads it is also possible to prepare a column whose geometry is known and controllable, a situation that cannot be attained with the irregularly shaped diatomite particles. While the soda-lime glass beads have made satisfactory supports with lightly loaded columns for nonpolar solutes, tailing nevertheless has been a problem for polar solutes. As used herein the term "nonpolar solute" includes aliphatic and aromatic hydrocarbon; while the term "polar solute" refers to organic molecules which have a permanent dipole and includes alcohols, ethers, ketones, aldehydes, acids, and esters, as well as organic halides, nitrogen compounds, sulfur compounds, phosphorus compounds, and polar derivatives thereof.

It is therefore an object of the present invention to provide an improved glass bead support for chromatographic columns.

Another object of the present invention is to provide an improved method of separating compounds by gas-liquid chromatography through the use of an inert glass bead support.

In accordance with the present invention, we have discovered a method of separating complex mixtures of compounds into their components by passing them in the vapor phase with an inert carrier gas through a liquid partition zone containing a stationary phase of an inert alkali silicate glass support. The unique feature is directed to the glass composition which consists essentially of 50–95 mole percent silica and 5–50 mole percent of alkali metal oxide. This glass support is substantially in the form of spherical beads having a particle size of 20–150 mesh U.S. Standard sieve. Optionally, the efficiency of the column can further be increased by subjecting the glass beads to a leaching treatment. The advantage in our glass beads over supports heretofore used, including glass microbeads, resides in the improved symmetry of the elution peaks for polar solutes and efficiency of the column. Beads prepared from the range of glass compositions set forth can be used satisfactorily to separate polar organic compounds with substantially an absence of tailing effects.

The invention is more clearly understood from the following description taken in conjunction with the accompanying drawing in which.

Figure 1:
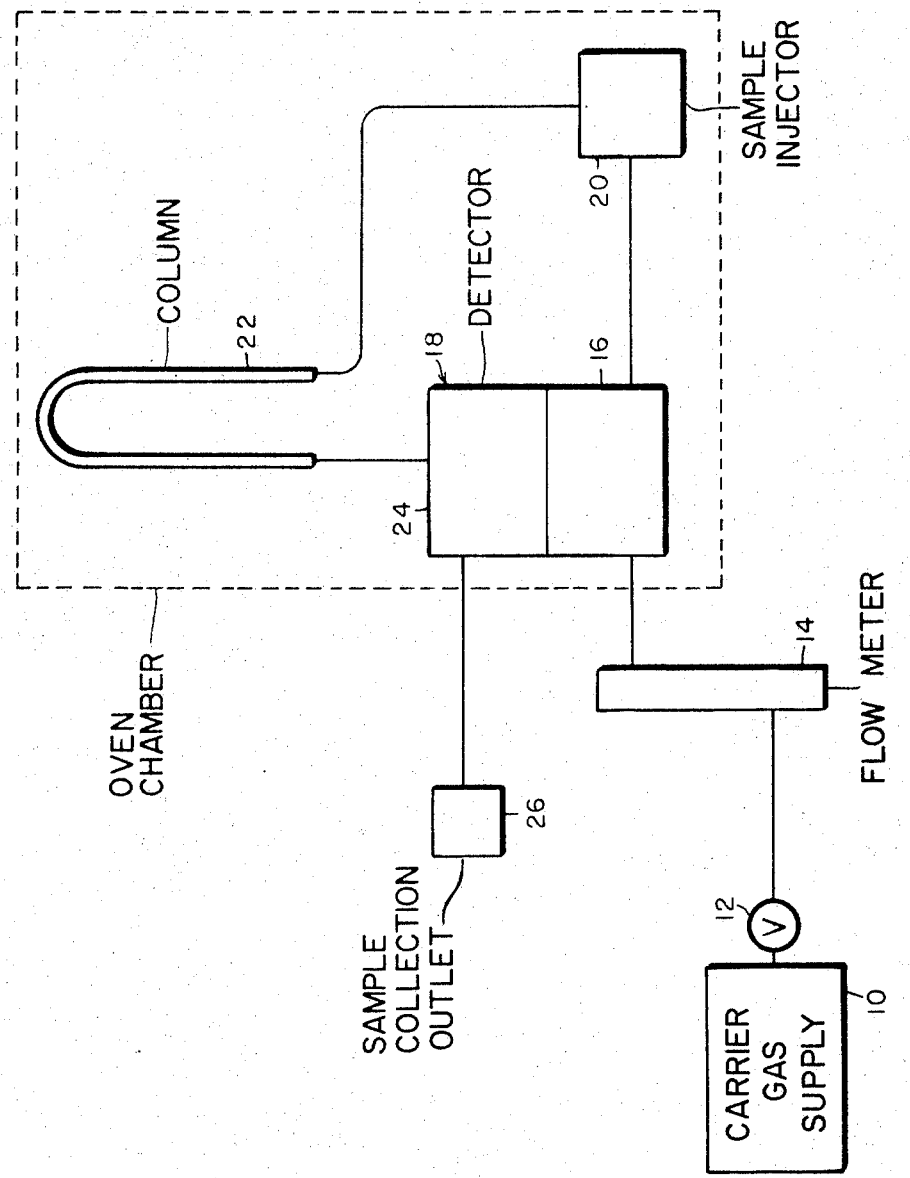
FIGURE 1 is a flow schematic diagram of a conventional apparatus used in gas liquid chromatography.

Referring now to FIGURE 1, this simple flow pattern indicates the operation of a commercially available instrument for gas chromatography sold by Perkin-Elmer under the name Vapor Fractometer. The carrier gas 10 supplied from an external tank is maintained at constant flow rate by a pressure regulator 12. It passes through a flowmeter 14, and then by the reference side 16 of thermal conductivity detector 18 before the point of sample injection 20 is reached. At the liquid injection port, a flash heater vaporizes the sample instantly. Carrier gas and sample vapor then pass through a packed column 22, wherein the sample components are separated, and swept one by one into the sensing side 24 of the detector 18. Both sides of the thermal conductivity cell are incorporated into a balance bridge circuit. When a thermal conductivity difference occurs between the gas alone and the sample vapor in the carrier gas, a resulting bridge unbalance provides a voltage which drives the pen on a standard strip-chart recorder. The carrier gas and sample mixture then passes out to the atmosphere through the heated sample collection outlet 26 where it may be trapped or simply vented.

Figure 2:
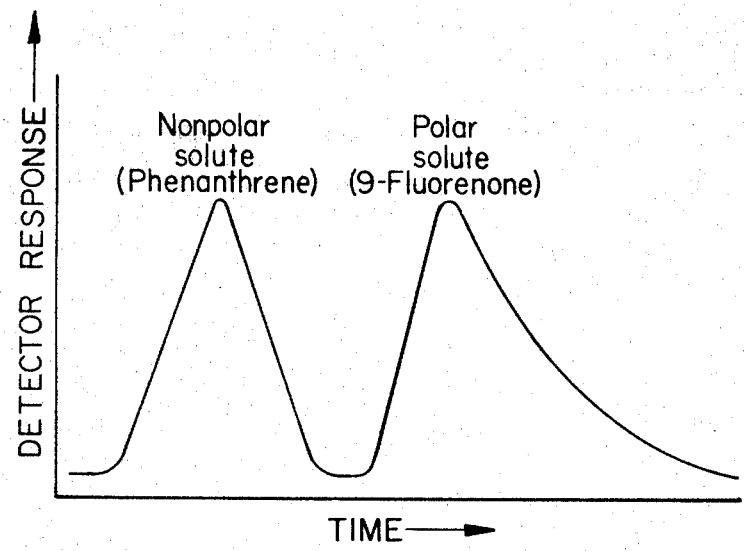
FIGURE 2 is a chromatogram illustrating the configuration of the peaks for polar and nonpolar solutes using a conventional soda-lime glass microbead support.

The separation of polar and nonpolar solutes and the configuration of the peaks using a column packed with soda-lime glass beads is illustrated by FIGURE 2. It can be seen that the nonpolar solute gave satisfactory resolution, while the polar solute showed significant peak tailing. From these results it can be concluded that the soda-lime glass beads are not inert and that there was some adsorption of the polar solute on the support.

Figure 3:
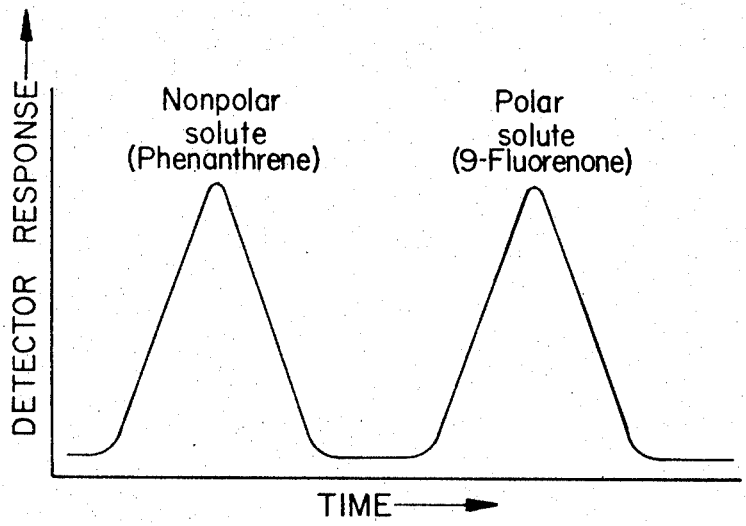
FIGURE 3 is a chromatogram illustrating the configuration of the peaks for polar and nonpolar solutes using the novel alkali-silicate bead supports.

In the illustration shown in FIGURE 3, polar and nonpolar solutes are separated using a column packed with the novel alkali-silicate beads. Satisfactory separation and resolution is obtained for both polar and nonpolar solutes. No significant peak tailing is observed for polar solutes. Thus, no chemical or physical reaction appears to occur between the alkali-silicate support and the solutes It is thought that the tailing of polar molecules on soda-lime glass beads is due to a heterogeneous glass surface caused by the presence of Lewis acid sites. But these sites are not present on the surface of alkali silicate beads.

Figure 4A:
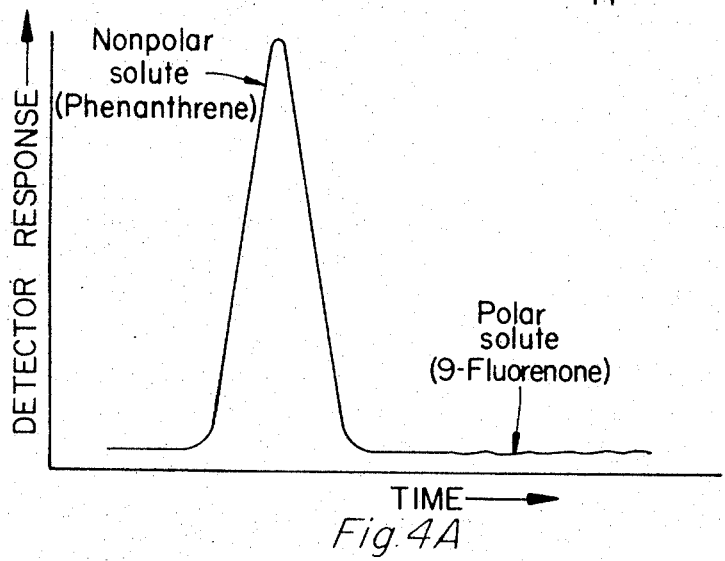
FIGURES 4A and 4B illustrate the effect of etching of conventional soda-lime glass beads and the novel alkali silicate beads on the separation of polar and nonpolar solutes.
Figure 4B:
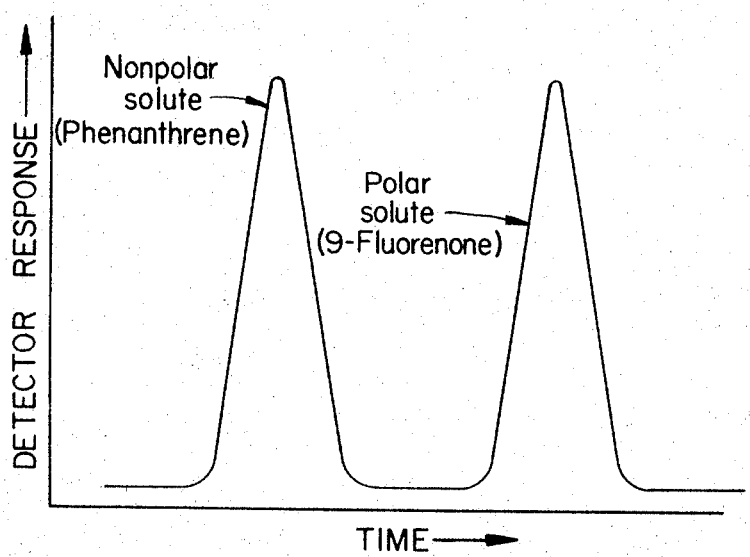

Referring now to FIGURES 4A and 4B, the effect of etching is shown for both soda-lime glass and alkali-silicate beads. The results are again dependent upon the nature of the solute. In the case of nonpolar solutes, etching increases the efficiency of columns containing alkali-silicate glass or soda-lime glass beads. However for the polar solutes the alkali-silicate beads give increased efficiency, while the soda-lime glass beads react so strongly with the polar materials that there may be almost complete adsorption.

The alkali silicate beads of the present invention functions as a support for the liquid solvent while being substantially inert to the moving phase. These properties are directly the result of the chemical composition. Alkali-silicate beads as used herein are prepared from a glass consisting essentially of:

| Ingredient | Range, mole percent | Preferred, mole percent |
| --- | --- | --- |
| Alkali metal oxide | 5-50 | 10-20 |
| Silica | 50-95 | 80-90 |

Glasses containing more than 95% silica are too difficult to melt and are quite difficult to etch uniformly, while those containing less than 50% silica do not retain their bead structure upon etching and will tend to crumble to form irregular-shape particles. The alkali metal oxides in the glass composition include lithium oxide, sodium oxide, potassium oxide and mixtures thereof. It is very important that the glass contain no calcium oxide, magnesium oxide, boric oxide, aluminum oxide or any metal oxide which produces Lewis acid sites on the surface of the glass.

In terms of physical properties, the glass bead support should be substantially uniform and have a spherical shape to give a minimum contact between adjacent beads when packed in the chromatographic column. The overall bead size range should be from 20-150 mesh U.S. Standard sieve, but advantageously individual particles for a given column should not exceed more than a difference of 20 mesh. In a preferred embodiment the particles are 60/80 mesh and 80/100 mesh. As another factor to be considered, the beads must be able to maintain their characteristics at the temperature used for the chromatogaphic column. For practical purposes, a temperature of operation is selected which is sufficiently high for all the components to be eluted in a reasonable time. This temperature is usually around the middle of the boiling range of the sample. The separation of particularly nonvolatile compounds may require temperatures up to about 325° C.

Optionally, the alkali-silicate beads may be subjected to a surface leaching treatment. Leaching increases the surface available for the liquid solvent and correspondingly increases the efficiency of the column by producing better resolution of the individual components. This may be explained by the fact that the liquid phase is largely retained by surface tension at the contact points between the beads and when the surface of the beads has been roughened or grooved, the capillary liquid is removed from the contact points and the liquid solvent is more evenly distributed on the support. The leaching technique used depends at least to some extent on the glass composition: the higher the silica content the stronger the leaching treatment to remove an equal amount of surface material. It is generally desirable, with the small glass particles, to employ a mild leach. Control of leaching is maintained by selection of the particular reagent, the strength of the leaching solution, the temperature of the solution and the length of treatment time. Particularly satisfactory etchants are solutions of fluorides, such as dilute hydrofluoric acid, and ammonium bifluoride. In a preferred embodiment, the alkali silicate beads are treated with a 1.0-10% aqueous solution of ammonium bifluoride at room temperature for 5-15 minutes.

A general discussion of the field and the prior art is set forth by D. Ambrose et al., Gas Chromatography, Van Nostrand Co., Princeton, 1962. This detailed description is applicable to a large extent to the present invention. Thus, commonly used liquid solvents known in the chromatographic field, such as Dow Corning silicone oils 550 and 710 are equally useful for the present process. These should be lightly loaded on the column in amounts not greater than 3% by weight of the support and preferably in the range of 0.15-0.60%.

Several gases have been used as carriers, including hydrogen, nitrogen, mixtures of hydrogen and nitrogen, helium, argon and carbon dioxide. The gases are passed through the column at low rates of flow of about 20-50 milliliter per minute at pressures not much above atmospheric.

My invention is further illustrated by the following examples.

Examples

Gas chromatographic measurements were made with a Perkin-Elmer model 154C Vapor Fractometer, designed for operation from room temperature to about 250° C. The chromatograph was modified by winding a heating tape, powered by an auxiliary voltage supply, around the injection block. The block was then covered with glass wool to insulate it from the oven. The chromatograph was equipped with a conventional thermal conductivity detector, electrometer, and 0-5 mv. recorder. Columns were prepared from 6 foot, ¼ inch O.D. lengths of U-shaped copper tubing.

The mole and weight percent composition, and melting conditions for alkali-silicate glass melts are presented in Tables I through IV. Similar information for a soda-lime glass is shown in Table V.

TABLE I.—LITHIUM SILICATE

| | Mole Percent | Weight Percent |
| --- | --- | --- |
| Oxide: | | |
| $SiO_2$ | 85.0 | 91.9 |
| $Li_2O$ | 18.0 | 8.1 |

TABLE II.—SODIUM SILICATE

| Oxide: | Mole Percent | Weight Percent |
|---|---|---|
| SiO₂ | 85.0 | 85.4 |
| Na₂O | 15.0 | 14.6 |
| SiO₂ | 75.0 | 74.4 |
| Na₂O | 25.0 | 25.6 |
| SiO² | 90.0 | 89.7 |
| Na₂O | 10.0 | 10.3 |

TABLE III.—POTASSIUM SILICATE

| Oxide: | Mole Percent | Weight Percent |
|---|---|---|
| SiO₂ | 85.0 | 78.3 |
| K₂O | 15.0 | 21.7 |

TABLE IV.—MIXED ALKALI SILICATE

| Oxide: | Mole Percent | Weight Percent |
|---|---|---|
| SiO₂ | 85.0 | 81.3 |
| Na₂O | 7.5 | 7.4 |
| K₂O | 7.5 | 11.2 |

TABLE V.—SODA LIME

| Oxide: | Mole Percent | Weight Percent |
|---|---|---|
| SiO₂ | 61.0 | 64.0 |
| Na₂O | 12.9 | 14.0 |
| CaO | 13.3 | 13.0 |
| MgO | 12.8 | 9.0 |

Batch materials were melted under standard conditions at temperatures of 1450–1600° C. for about 16 hours in a covered platinum crucible. The melt was then stirred for one hour. Glass particles were then ground and sized to 80/100 mesh.

The glass beads used in this investigation were prepared using the following technique. Alkali silicate or soda-lime glass was crushed to particles of the approximate size of the desired glass beads. The powder was allowed to flow through a high velocity gas oxygen flame (T. >2000° C.) where it was melted and shot into spherically shaped beads. Beads were collected and sized for use in a column. Alkali-silicate and soda-lime beads were leached by immersing them in a 10% solution of ammonium bifluoride for 15 minutes with constant stirring. Thereafter the leached beads were thoroughly washed and dried.

The column packings were prepared using standard procedures by dissolving the liquid phase, Dow Corning 550 fluid, in chloroform. After the resulting solution was added to the beads, the volatile solvent was evaporated from the mixture under mild heating in a rotary evaporator. Columns were made from quarter inch copper tubing six feet in length to which the beads were added with vigorous tapping along the side of the tube until no more packing was accepted. These columns were made with approximately 50 grams of glass beads. When the glass beads were not free flowing, introduction of the beads into the tubing was made in small portions.

The packed column was then placed in the Vapor Fractometer as shown in FIGURE 1. With 35 ml./min. of helium flowing through the column, it was conditioned at 200° C. overnight, and was then ready for evaluation.

Samples of the compounds in an amount of one microgram were injected onto the chromatographic column using a 10 microliter syringe. In the case of solids, the samples were dissolved in chloroform. The following polar and nonpolar solutes were investigated as representative compounds: acetone, benzene, carbon tetrachloride, ethanol, pentane, o-phenylphenol, diphenylamine, benzophenone, 9-fluorenone, dibenzylamine, phenanthrene, and pyridine.

Typical results are shown in FIGURES 2–4B and these may be summarized as follows:

TABLE VI

| Column Support | Nonpolar Solute | Polar Solute |
|---|---|---|
| Alkali-silicate beads | Satisfactory, no tailing | Satisfactory, no tailing. |
| Soda lime beads | do | Peak tailing. |
| Etched alkali-silicate beads | Increased efficiency, no tailing | Sharper peak but longer elution time. |
| Etched soda-lime beads | do | Substantially complete adsorption. |

As used herein the terms "etching" and "leaching" are considered to be synonymous.

We claim:
1. A chromatographic column containing a solid support material comprising beads of a glass consisting essentially as calculated from the batch on the oxide basis of 50–95 mole percent of silica and 5–50 mole percent of alkali metal oxide, said beads having a liquid solvent coated thereon.

2. The chromatographic column of claim 1, wherein said beads are substantially spherical and have a particle size of 20–150 mesh U.S. Standard sieve.

3. The chromatographic column of claim 2, wherein said alkali metal oxide is sodium oxide.

4. The chromatographic column of claim 2, wherein said alkali metal oxide is lithium oxide.

5. The chromatographic column of claim 2, wherein said alkali metal oxide is potassium oxide.

6. The chromatographic column of claim 2, wherein said alkali metal oxide is a mixture of at least two alkali metal oxides.

7. The chromatographic column of claim 2, wherein said beads have been subjected to a leaching treatment.

8. A method of separating complex mixtures into their components comprising passing said mixture in the vapor phase with an inert carrier gas through a liquid partition zone containing a stationary phase on a solid support comprising particles of a glass consisting essentially as calculated from the batch on the oxide basis of 50–95 mole percent of silica and 5–50 mole percent of alkali metal oxide.

9. The method of claim 8, wherein said particles are substantially spherical and have a size of 20–150 mesh U.S. Standard sieve.

10. The method of claim 9, wherein said alkali metal oxide is a member selected from the group consisting of sodium oxide, lithium oxide, potassium oxide, and mixtures thereof.

11. The method of claim 9, wherein the spherical particles have been subjected to a leaching treatment.

12. The method of claim 11, wherein said spherical particles are treated with a 1.0–10% aqueous solution of ammonium bifluoride.

(References on following page)

References Cited

UNITED STATES PATENTS

| | | | |
|---|---|---|---|
| 3,077,103 | 2/1963 | Heaton | 55—197 X |
| 3,223,747 | 12/1965 | Bohrer | 55—197 X |

FOREIGN PATENTS

| | | |
|---|---|---|
| 605,788 | 9/1960 | Canada. |
| 614,357 | 2/1961 | Canada. |
| 863,776 | 3/1961 | Great Britain. |

OTHER REFERENCES

Gas Chromatography Abstracts, 1965, 128, p. 25, Ohline et al.

The Condensed Chemical Dictionary, seventh edition, 1966, Reinhold, New York, p. 56.

REUBEN FRIEDMAN, *Primary Examiner.*

J. L. DeCESARE, *Assistant Examiner.*